United States Patent [19]

Herr et al.

[11] 4,355,255

[45] Oct. 19, 1982

[54] BRUSHLESS DIRECT CURRENT MOTOR AND CONTROL THEREFOR

[75] Inventors: John A. Herr, Garwood; Wolfgang Jaffe, Roselle Park, both of N.J.

[73] Assignee: The Singer Company, Stamford, Conn.

[21] Appl. No.: 70,293

[22] Filed: Aug. 28, 1979

[51] Int. Cl.$^3$ ............................................. H02K 29/00
[52] U.S. Cl. ........................................ 310/254; 310/43; 318/138
[58] Field of Search ................... 318/138, 254, 254 A, 318/43, 89, 439; 310/194, 254, 258

[56] References Cited

U.S. PATENT DOCUMENTS

| | | | |
|---|---|---|---|
| 2,548,133 | 4/1951 | Treat | 310/43 |
| 2,797,376 | 6/1957 | Meade | 318/138 |
| 2,929,008 | 3/1960 | Wilcox | 318/138 |
| 3,375,422 | 3/1968 | Boudigues | 318/138 |
| 3,678,352 | 7/1972 | Bedford | 318/138 |
| 3,806,785 | 4/1974 | DeValroger et al. | 318/138 |
| 3,891,876 | 6/1975 | Herr et al. | 310/43 |
| 3,898,544 | 8/1975 | Tanikoshi | 318/138 |
| 3,932,929 | 1/1976 | Hallerback et al. | 310/43 |

Primary Examiner—J. D. Miller
Assistant Examiner—D. L. Rebsch
Attorney, Agent, or Firm—David L. Davis; Robert E. Smith; Edward L. Bell

[57] ABSTRACT

A brushless direct current motor is provided with a rotor having a rare earth magnet within a nonferrous cylinder and a pair of coil windings which are air wound. To effect rotation of the rotor, current through the coils is controlled to rotate the resultant magnetic flux generated by the currents through the coils so that the rotor attempts to align itself magnetically with the resultant flux from the coils. Both coils are simultaneously energized and the polarity of current flow through the coils is reversed in such a manner that there is a current reversal through only one of the coils whenever the current is switched. Coil switching is directed by a triggering magnet fixed on the rotor shaft, which magnet operates Hall effect switches. The Hall effect switches in turn operate power switches to apply the correct voltage and polarity simultaneously to both windings.

7 Claims, 14 Drawing Figures

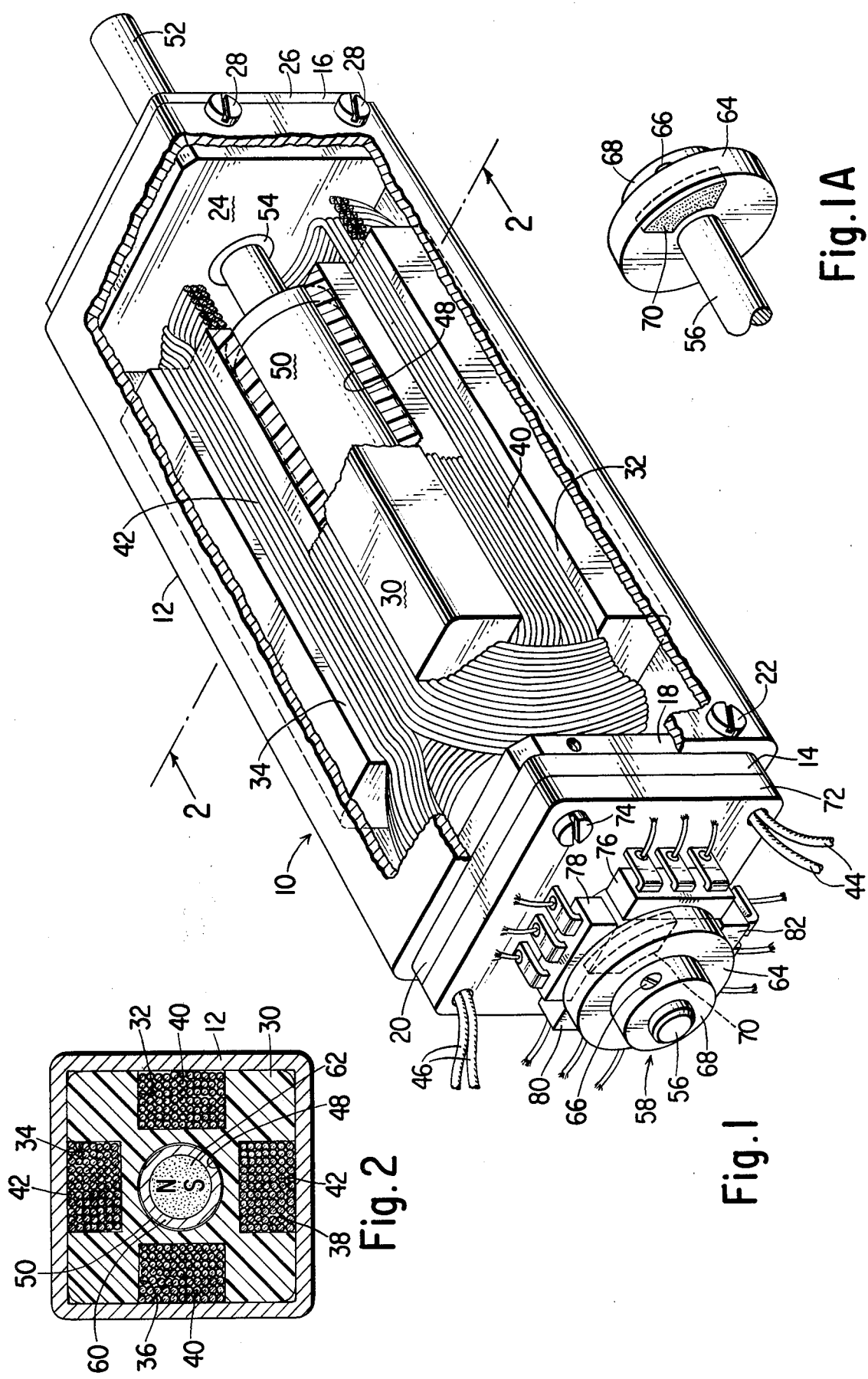

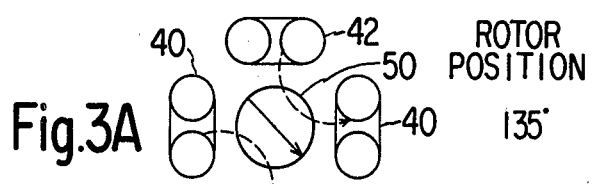
Fig.3A   135°
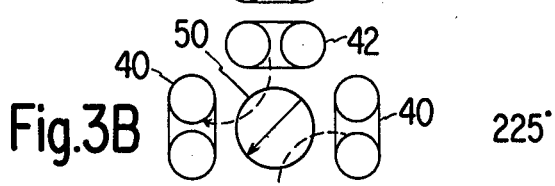
Fig.3B   225°
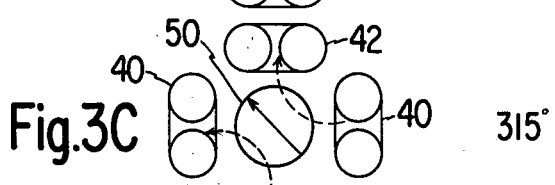
Fig.3C   315°
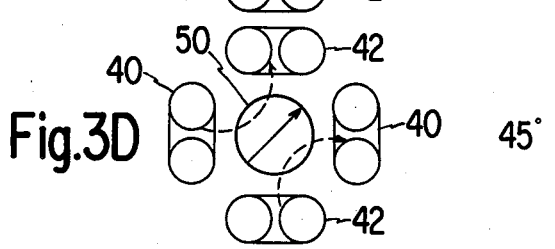
Fig.3D   45°
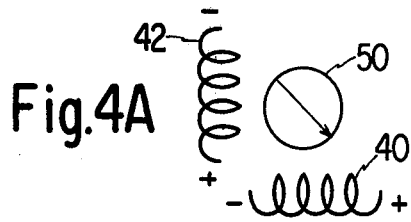
Fig.4A
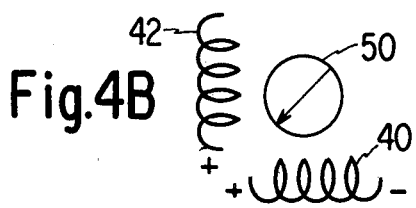
Fig.4B
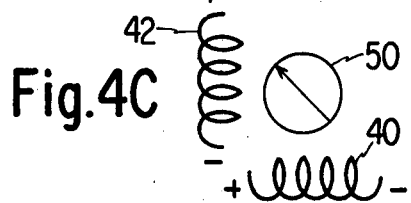
Fig.4C
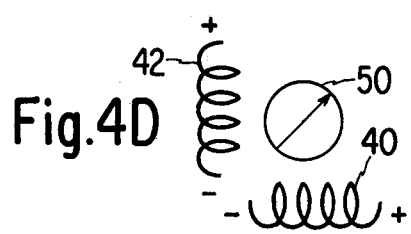
Fig.4D
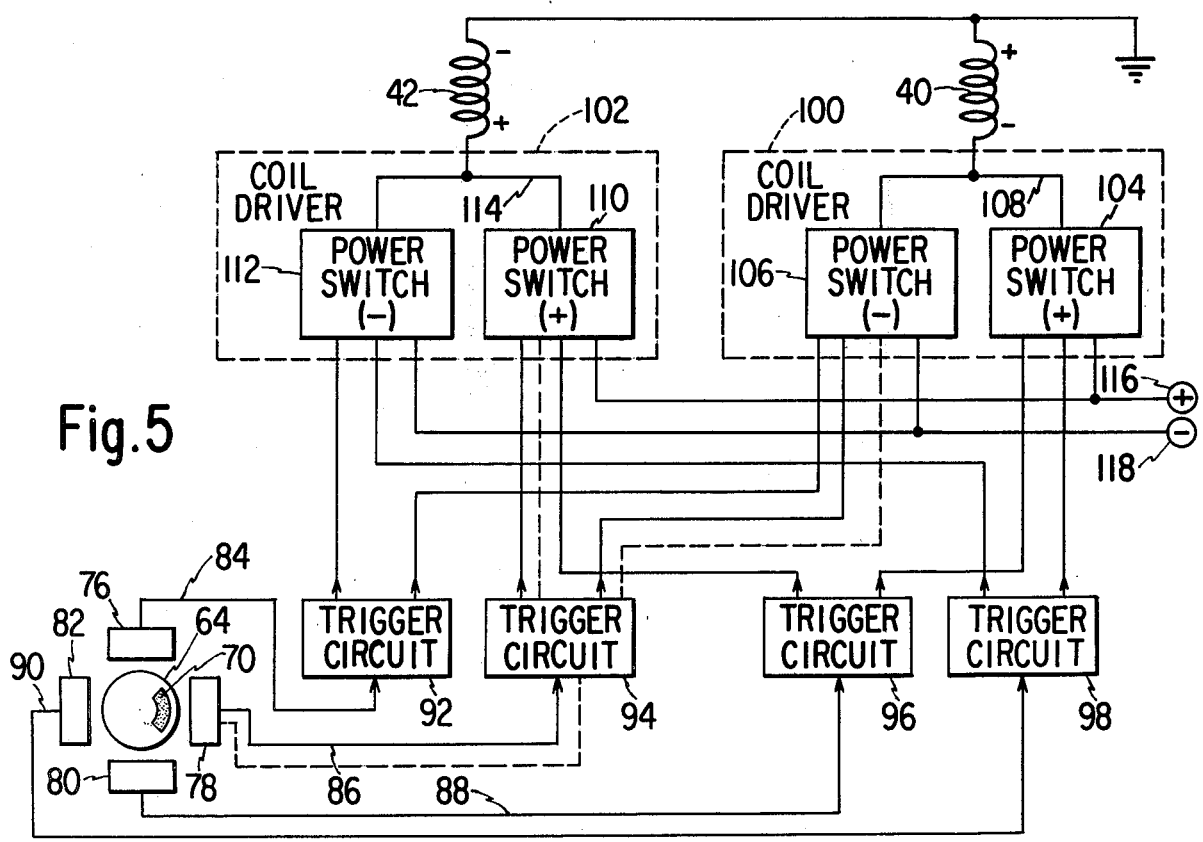
Fig.5

BRUSHLESS DIRECT CURRENT MOTOR AND CONTROL THEREFOR

DESCRIPTION

Background of the Invention

This invention relates to direct current motors and, more particularly, to brushless direct current motors having permanent magnet rotors.

In a direct current motor of conventional design, some of the primary problems encountered are caused by the mechanical combination of the commutator segments and the brush contacts. Typically, a rotor rotatably mounted in the housing of the motor is provided with a plurality of coils, one end of each of these coils being connected to each of the commutator segments mounted on the rotor shaft while the brush contact is supported in a raised manner on the motor housing and is spring biased in contact with the commutator segments. Thus, the brush and commutator are kept in mechanical and slidable contact with each other, generating sparks and appreciable noise. At a high running speed of the motor, the brush will spring up from contact with the commutator, interrupting the electrical contact and disrupting smooth running of the motor. Additionally, wear of the brush and commutator will be encountered which will eventually result in motor failure.

It is therefore an object of this invention to eliminate the aforementioned mechanical problems by replacing the conventional commutator-brush combination by a noncontact switching arrangement. There have been proposals in the past to utilize magnetically responsive switching elements, such as Hall effect devices, in combination with rotating permanent magnets, either as the rotor element of the motor or separate therefrom, to effect the sequential energization of the motor coils. However, these arrangements suffer from certain drawbacks. For example, when the coils are wound on iron cores, the switching speed of the coils is limited due to the magnetic hysteresis effect of the iron core and hence the speed of the motor is limited. Additionally, the iron core causes reduced motor efficiency due to heating. Printed circuit motors overcome some of these deficiencies but due to their large diameter, the inertial effects limit the speed and acceleration of the motor.

It is therefore another object of this invention to provide a brushless direct current motor having high speed and acceleration characteristics.

SUMMARY OF THE INVENTION

The foregoing and additional objects are attained in accordance with the principles of this invention by providing a brushless direct current motor which includes a housing and a non-magnetic winding frame member fixedly mounted inside the housing. At least two coils of wire are wound on the winding frame member, each of the coils being substantially planar with the planes defined by the coils being equiangularly spaced. A permanent magnet rotor is mounted for rotation about an axis within the winding frame member, the axis being parallel to all of the coil planes and the permanent magnet rotor being magnetized in a direction orthogonal to the axis. A position sensing assembly responsive to the angular orientation of the rotor about the axis provides position signals indicative of the angular orientation. A source of bi-directional direct current is provided and circuitry responsive to the position signals selectively switches the bi-directional direct current simultaneously through all of the coils.

In accordance with an aspect of this invention, the current switching circuitry controls the reversal of current flow through the coils so that there is a current reversal through only one of the coils whenever the current is switched.

BRIEF DESCRIPTION OF THE DRAWINGS

The foregoing will be more readily apparent upon reading the following description in conjunction with the drawings wherein:

FIG. 1 is a perspective view, partially cut away, of a motor constructed in accordance with the principles of this invention and FIG. 1A is a detailed view of a portion of the position sensing assembly thereof;

FIG. 2 is a cross-sectional view taken along the line 2—2 of FIG. 1;

FIGS. 3A–3D diagrammetically illustrate the magnetic switching of the motor coils at different angular orientations of the rotor;

FIGS. 4A–4D diagrametically illustrate the electrical switching of the motor coils for the angular orientations of the rotor depicted in FIGS. 3A–3D, respectively;

FIG. 5 is a block diagram of a system for controlling the motor of FIG. 1 in accordance with the principles of this invention.

DETAILED DESCRIPTION

Figure 6A:
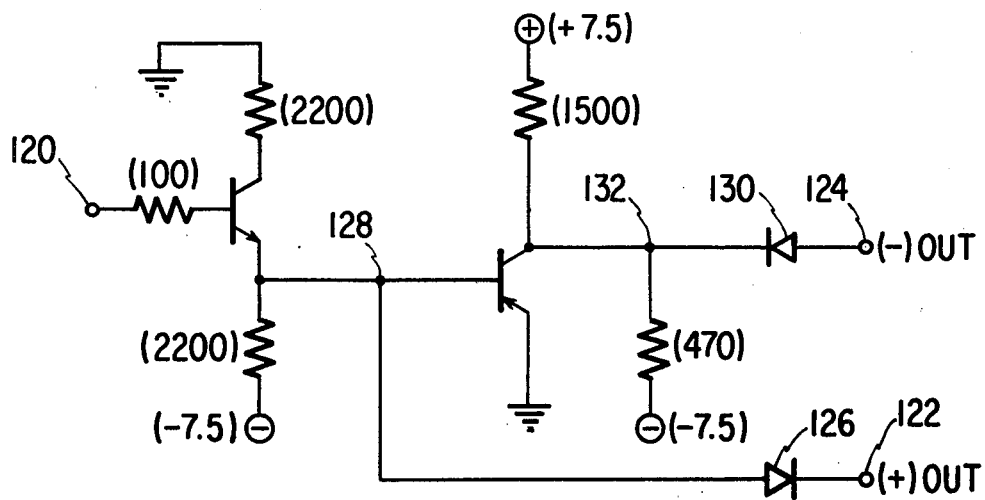
FIGS. 6A and 6B are detailed schematic circuit diagrams of preferred embodiments of circuitry which may be utilized to implement the system depicted in block diagram form in FIG. 5.

Referring now to the drawings, wherein like elements in different figures thereof have the same reference character applied thereto, FIG. 1 is a perspective view, partially cut away, of a motor designated generally by the reference numeral 10 constructed in accordance with the principles of this invention. The motor 10 generally comprises a four-sided box-like housing 12, the open ends of which are closed by end caps 14 and 16. The housing 12 may be constructed either of a ferromagnetic material or a non-magnetic material. The end cap 14 is preferably of non-magnetic material and is formed with a portion 18 which fits inside the housing 12 and a shoulder portion 20 which closes one of the open ends of the housing 12. The portion 18 of the end cap 14 which fits inside the housing 12 has internally threaded holes formed therein and a plurality of threaded screws 22 extend through holes in the housing 12 so as to be threaded into respective holes in the end cap 14 to secure the end cap 14 to the housing 12. Similarly, the end cap 16 is preferably formed of non-magnetic material with a portion 24 which fits inside the other end of the housing 12 and a shoulder portion 26 which covers that other end of the housing 12. A plurality of internally threaded holes are formed in the portion 24 of the end cap 16 whereby a plurality of threaded screws 28 may extend through holes in the housing 12 to be threaded into respective holes in the portion 24 to secure the end cap 16 to the housing 12.

Fitted within the housing 12 is a winding frame member 30 made of non-magnetic material, preferably a molded plastic material. As shown in FIG. 2, the winding frame member 30 has a generally square cross sectional configuration with elongated and recessed slots 32, 34, 36 and 38 formed therein. The slots 32–38 extend the length of the winding frame member 30. A first coil of electrically conductive wire indicated generally at 40 is wound in the slots 32 and 36. A second coil of electrically conductive wire indicated generally at 42 is wound in the slots 34 and 38. The conductive wire forming the coils 40 and 42 is preferably covered with lacquer for insulating purposes. The ends 44 of the coil 40 and the ends 46 of the coil 42 are covered with an insulating material and extend through holes in the end cap 14. The winding frame member 30 is formed with a central cylindrical bore 48, the axis of which defines a longitudinal axis for the motor 10.

The coils 40 and 42 are substantially planar. Although only two coils 40 and 42 are shown, it is understood that this invention may be adapted to include more than two coils. In any event, the planes defined by the coils will be equi-angularly spaced and the longitudinal axis defined by the cylindrical bore 48 will be parallel to all of the coil planes. In particular, for the embodiment disclosed herein, the planes defined by the coils 40 and 42 intersect at right angles and this intersection defines the longitudinal axis.

The motor 10 includes a permanent magnet rotor 50 adapted to fit within the cylindrical bore 48 of the winding frame member 30. The rotor 50 has an output shaft 52 at one end thereof journalled for rotation in a suitable bearing member 54 fitted in the end cap 16. The other end of the rotor 50 is fixedly coupled to a shaft 56 connected to a position sensing assembly 58, to be described in more detail hereinafter. The rotor 50 includes a hollow cylindrical sleeve 60 of non-magnetic material, preferably brass. Inside the sleeve 60 is a permanent magnet 62. In the embodiment shown in FIG. 2, the permanent magnet 62 has a circular cross section and fits snuggly within the sleeve 60. An alternative embodiment, although not shown herein, includes a permanent magnet of rectangular cross section potted in place within the sleeve 60 by means of epoxy or some other similar material. In either case, the permanent magnet 62 is magnetized in a direction orthogonal to the longitudinal axis defined by the cylindrical bore 48, as illustrated by the letters "N" and "S" shown in FIG. 2 to depict the magnetic poles. Preferably, the permanent magnet 62 is a rare earth magnet, so that a strong magnetic field is obtainable.

The position sensing assembly 58 includes a disc 64 fixedly coupled to the shaft 56 by means of a set screw 66 threaded through an opening in a small diameter portion 68 of the disc 64. As shown in FIG. 1A, embedded within the disc 64, and substantially flush with the surface closest to the motor 10, is an arc segment magnet 70. The arc magnet segment 70 is magnetized in a direction parallel to the above defined longitudinal axis, illustratively with its South pole closer to the motor 10 than is its North pole. The sensor assembly 58 further includes a plate 72 secured to the end cap 14 by means of screws 74. Mounted on the plate 72, between the plate 72 and the disc 64, are four magnetically responsive switching elements 76, 78, 80 and 82, illustratively Hall effect devices. The magnetically responsive switching elements 76-82 respond to the magnetic flux generated by the arc segment magnet 70 as it passes in close proximity to each of the switching elements 76-82 to provide a voltage signal, in a manner well known in the art. To insure that only one of the switching elements 76-82 provide such a signal, the arc segment magnet 70 must be no greater than 90° of arc.

The operation of the motor 10 will now be explained with reference to FIGS. 3A–3D and 4A–4D which diagrammatically illustrate the magnetic and electrical switching of the motor coils 40 and 42 to effect rotation of the rotor 50. Since the coils 40 and 42 are air-wound, their inductance is very low and hence the direction of current flow through the coils can be reversed substantially instantaneously. Since there is no ferro-magnetic core, there is no magnetic hysteresis effect and the reversal of current flow effects a substantially instantaneous reversal of magnetic field.

Accordingly, in contrast with conventional permanent magnet motors where the coils are sequentially energized one at a time, in the motor according to this invention both of the coils are simultaneously energized and at predetermined angular orientations of the rotor the direction of current flow through one of the coils is reversed. As diagrammatically illustrated in FIGS. 3A and 4A, with the line of magnetization of the rotor 50 being at 135° from the vertical, the coils 40 and 42 have current flow therethrough to set up a resultant magnetic field, as shown by the curved broken arrows in FIG. 3A, to cause the rotor 50 to be aligned therewith. At this point, the direction of current flow through the coil 40 is reversed, as shown in FIG. 4B, to set up a resultant magnetic field which causes the rotor 50 to rotate to the position shown in FIG. 3B. FIGS. 3C, 3D, 4C and 4D depict the other two coil energization conditions. It is noted from an examination of FIGS. 3A–3D and 4A–4D that each time the current through the coils is switched, there is a current reversal through only one of the coils.

Current switching is effected through the combination of the arc segment magnet 70 and the Hall effect switching elements 76–82, which are sequentially operated as the rotor 50 rotates to provide signals for effecting current switching through the coils 40 and 42. Referring now to FIG. 5, shown therein is a block diagram of an illustrative system for effecting the aforedescribed operation of the motor 10. Each of the Hall effect devices 76–82 provides a positive voltage output signal on its respective output lead 84, 86, 88 and 90 when the arc segment magnet 70 passes thereby. This positive voltage signal is maintained for 90° of rotation of the rotor 50 due to the 90° arc length of the arc segment magnet 70. The output leads 84–90 are coupled as inputs to respective trigger circuits 92, 94, 96 and 98.

Each of the two coils 40 and 42 is connected to a respective coil driver circuit 100, 102. The coil driver circuit 100 includes a positive power switch 104 and a negative power switch 106, the outputs of which are coupled via the lead 108 to one end of the coil 40, the other end of which is coupled to ground, or neutral. Similarly, the coil driver circuit 102 includes a positive power switch 110 and a negative power switch 112, the outputs of which are coupled via the lead 114 to one end of the coil 42, the other end of which is connected to ground, or neutral. The positive power switches 104 and 110 are connected to a positive voltage source 116 and the negative power switches 106 and 112 are connected to a negative voltage source 118. Each of the trigger circuits 92, 94, 96 and 98, is connected to a unique pair of power switches 104, 106, 110 and 112, one in each of the coil drivers 100 and 102, so that when a voltage input signal is received from its respective Hall effect element 76–82, the appropriate power switches are energized to provide a current path between ground and the voltage sources 116 and 118 in the proper directions to effect the switching sequence depicted in FIGS. 3A–3D and 4A–4D. For example, when the Hall effect sensor 78 provides a voltage signal over the lead 86, the trigger circuit 94 enables the negative power switch 106 for the coil 40 and the positive power switch 110 for the coil 42 (as indicated by the dotted lines in FIG. 5).

Referring now to FIG. 6A, shown therein is a schematic diagram of a preferred embodiment for the trigger circuits 92–98. In FIG. 6A, the resistance values, in ohms, are enclosed in parentheses in close proximity to the respective resistors and the potentials of the voltage sources, in volts, are in parentheses in close proximity to the respective voltage sources. The input terminal 120 is connected to receive a signal from a respective one of the Hall effect elements 76–82. The terminal 122 is a positive output terminal and would be connected to the input of one of the positive power switches 104, 110. The output terminal 124 is a negative output terminal and would be connected to the input of one of the negative power switches 106, 112. If the particular trigger circuit is to be connected to two positive power switches, an additional output diode 126 would be provided having its anode connected to the junction point 128 and its cathode connected to a second output terminal 122. Likewise, if the trigger circuit is to be connected to two negative power switches, an additional output diode 130 would be provided having its cathode connected to the junction point 132 and its anode connected to a second output terminal 124.

Figure 6B:
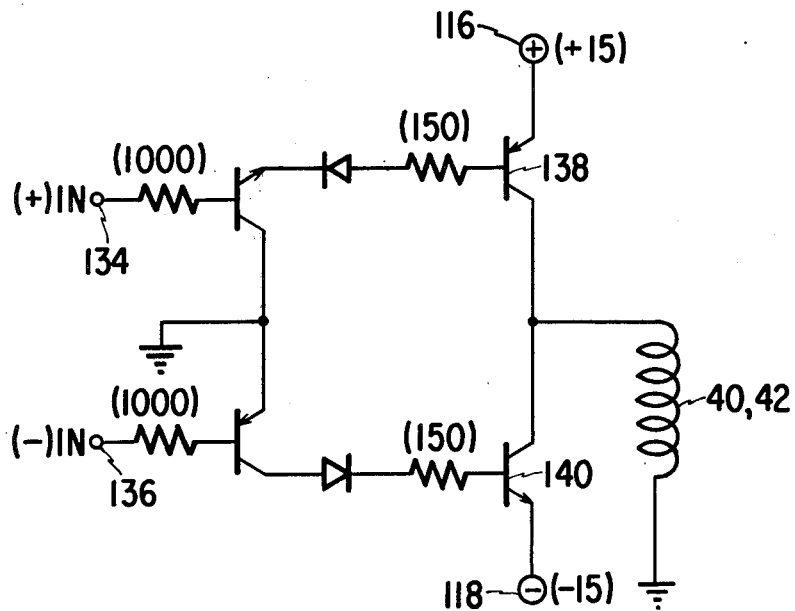

FIG. 6B depicts a circuit diagram of a preferred embodiment for the coil driver circuits 100, 102 wherein the resistance values, in ohms, are shown in parentheses in close proximity to the respective resistors and the potentials, in volts, of the voltage sources are shown in parentheses in close proximity thereto. The upper half of the circuit shown in FIG. 6B corresponds to a positive power switch and has its input terminal 134 connected to a positive output terminal 122 of one of the trigger circuits 92–98. Likewise, the lower half of the circuit shown in FIG. 6B is one of the negative power switches and has its input terminal 136 connected to the negative output terminal 124 of one of the trigger circuits 92–98. When a positive signal is applied to the positive input terminal 134, this causes the positive output transistor 138 to be turned on to provide a first direction of current flow from the voltage source 116 through the respective coil 40, 42. When a negative input signal is applied to the negative input terminal 136, this causes the negative output transistor 140 to be turned on to provide for a second direction of current flow through respective coil 40, 42 to the negative voltage source 118.

Speed control for the motor described above may be achieved by varying the supply voltage 116, 118. Alternatively, the trigger magnet disc 64 may be selectively advanced or retarded to vary the switching points for the magnetically responsive switches 76–82 to change the forces on the rotor 50. Although individual trigger circuits 92–98 have been shown, triggering may also be achieved through the use of a microprocessor which may be programmed to respond to control input signals for varying the speed.

Accordingly, there has been disclosed a brushless direct current motor having a permanent magnet rotor. It is understood that the above-described embodiment is merely illustrative of the application of the principles of this invention. Numerous other embodiments may be devised by those skilled in the art without departing from the spirit and scope of this invention, as defined by the appended claims. For example, although two coils have been illustrated, it is apparent that three or more coils may be utilized with appropriate adjustments to the sensing assembly and the drive circuitry.

We claim:

1. A brushless direct current motor comprising:
    a housing;
    a winding frame member of nonmagnetic material fixedly mounted inside said housing;
    at least two coils of wire wound on said winding frame member, each of said coils being substantially planar with the planes defined by the coils being equiangularly spaced;
    a permanent magnet rotor mounted for rotation about an axis within said winding frame member, said axis being parallel to all of said coil planes and said permanent magnet rotor being magnetized in a direction orthogonal to said axis;
    position sensing means responsive to the angular orientation of said rotor about said axis for providing a plurality of sequentially occurring position signals, said position sensing means including a plurality of angularly spaced switching devices which are sequentially switched in a nonoverlapping manner to provide said sequentially occurring position signals so that at any given time one and only one of said switching devices is providing a respective position signal;
    a source of bidirectional direct current; and
    coil energizing means responsive to said sequentially occurring position signals for selectively directing said bidirectional direct current simultaneously through all of said coils.

2. The motor according to claim 1 wherein said coil energizing means includes means for reversing the polarity of current flow through said coils so that there is a current reversal through only one of said coils whenever the current is switched.

3. The motor according to claim 1 wherein said position sensing means comprises:
    a permanent magnet fixedly coupled to said rotor for rotation therewith about said axis, said magnet being positioned outside said housing; and
    a plurality of magnetically responsive switching elements positioned radially and circumferentially around said axis in proximity to said permanent magnet so that rotation of said permanent magnet sequentially operates said switching elements, said permanent magnet subtending an arc so that one and only one of said switching elements is operated at any given time.

4. The motor according to claims 1, 2 or 3 wherein there are two coils, four switching elements and said arc of said position sensing means permanent magnet is 90° so that said position sensing means provides said sequentially occurring position signals each for a 90° angular interval.

5. The motor according to claim 3 wherein each of said magnetically responsive switching elements includes a Hall effect sensor.

6. The motor according to claim 1 wherein said housing is constructed of ferromagnetic material.

7. The motor according to claim 1 wherein said housing is constructed of non-magnetic material.

* * * * *